United States Patent
Izak et al.

(10) Patent No.: US 8,339,126 B2
(45) Date of Patent: Dec. 25, 2012

(54) POSITION-MEASURING DEVICE FOR DETERMINING RELATIVE POSITIONS AND METHOD OF ITS OPERATION

(75) Inventors: Richard Izak, Bad Aibling (DE); Johann Oberhauser, Vachendorf (DE); Robert Noichl, Rott (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 668 days.

(21) Appl. No.: 12/410,228

(22) Filed: Mar. 24, 2009

(65) Prior Publication Data

US 2009/0243596 A1 Oct. 1, 2009

(30) Foreign Application Priority Data

Mar. 27, 2008 (DE) .......................... 10 2008 015 837

(51) Int. Cl.
*G01B 7/30* (2006.01)
(52) U.S. Cl. .......... 324/207.25; 324/207.17; 324/207.16
(58) Field of Classification Search ............. 324/207.25, 324/200, 207.16–207.17
See application file for complete search history.

(56) References Cited

U.S. PATENT DOCUMENTS

| | | | | |
|---|---|---|---|---|
| 4,769,597 | A * | 9/1988 | Sano ........................ | 324/207.25 |
| 6,111,402 | A | 8/2000 | Fischer | |
| 6,534,970 | B1 * | 3/2003 | Ely et al. .................. | 324/207.17 |
| 6,693,420 | B1 * | 2/2004 | Gill ........................... | 324/207.16 |
| 6,943,543 | B2 * | 9/2005 | Gass et al. ................ | 324/207.17 |
| 7,719,264 | B2 * | 5/2010 | Tiemann ................... | 324/207.25 |
| 2008/0079422 | A1 * | 4/2008 | Tiemann ................... | 324/207.17 |
| 2008/0197838 | A1 * | 8/2008 | Fischer .................... | 324/207.25 |

FOREIGN PATENT DOCUMENTS

| | | |
|---|---|---|
| DE | 197 51 853 | 6/1998 |
| DE | 10 2006 046 531 | 4/2008 |
| EP | 0 872 712 | 10/1988 |

OTHER PUBLICATIONS

Search Report, European Application No. 08 16 9975, dated Aug. 8, 2009 (translated).

* cited by examiner

*Primary Examiner* — Jay Patidar
(74) *Attorney, Agent, or Firm* — Kenyon & Kenyon LLP

(57) ABSTRACT

A position-measuring device includes a measuring standard, on which at least one graduation track is applied, and a support member. Disposed on the support member is at least one exciter winding through which an excitation current is able to be conducted in order to generate an electromagnetic field, as well as at least one detector system for scanning the electromagnetic field, The position-measuring device further includes a capacitor which, together with the exciter winding, forms an LC oscillating circuit, an evaluation element and a switching element that is switchable by the evaluation element. The measuring standard and the support member are disposed in a manner allowing movement relative to each other, and in response to a movement of the measuring standard relative to the support member, the electromagnetic field is able to be influenced by the at least one graduation track. The LC oscillating circuit is operable by switching the switching element with an excitation current which induces in the detector system at least one voltage that is able to be processed electronically by the evaluation element to ascertain position information. The excitation current is generated by switching the switching element with switch-on pulses that have an ON time period, and the at least one voltage induced in the detector system is measured in the area after the cut-off edge of the switch-on pulse for ascertaining the position information.

21 Claims, 5 Drawing Sheets

US 8,339,126 B2

POSITION-MEASURING DEVICE FOR DETERMINING RELATIVE POSITIONS AND METHOD OF ITS OPERATION

CROSS-REFERENCE TO RELATED APPLICATIONS

The present application claims priority to Application No. 10 2008 015 837.2, filed in the Federal Republic of Germany on Mar. 27, 2008, which is expressly incorporated herein in its entirety by reference thereto.

FIELD OF THE INVENTION

The present invention relates to a position-measuring device for determining relative positions, which operates according to an inductive measuring principle, and a corresponding method for operating such a position-measuring device.

BACKGROUND INFORMATION

For example, inductive position-measuring devices may take the form of inductive rotary encoders for determining the angular position of two machine parts rotatable relative to each other. In inductive rotary encoders, exciter windings and receiver coils are applied, for instance, in the form of printed conductors on a shared printed circuit board that is fixedly joined, for example, to a stator of a rotary encoder. Opposite to this printed circuit board is a further board in the form of a code disk, on which electrically conductive and non-conductive surfaces are applied as a graduation region or graduation structure in alternation at periodic intervals, and which is joined in rotatably fixed fashion to the rotor of the rotary encoder. When an electrical exciter field, changing over time, is applied to the exciter windings by imparting an excitation current, signals are generated in the receiver coils during the relative rotation between rotor and stator, which are a function of the angular position, that is, the relative position between graduation structure and receiver coils. The reason for this has its roots in that the graduation structure influences, thus strengthens or weakens, the magnetic field produced by the excitation current. These signals are then further processed in evaluation electronics.

Such rotary encoders are often used as measuring devices for electric drive systems, to determine the absolute angular position of corresponding drive shafts. In this context, it is important, particularly from the standpoint of safety, that even after the system is shut down or in the event of a power failure, at least the full revolutions executed in this state are counted.

German Published Patent Application No. 197 51 853 describes an arrangement for an inductive rotary encoder, in which the excitation coils and receiver coils are disposed in a multilayer printed circuit board structure.

In order for such a rotary encoder to be able to at least count the number and direction of rotation of the full revolutions covered, even when the system voltage supply is absent, in conventional methods, suitable magnets are provided at the rotor, and two or more magnetic sensors, which generate counting signals, are provided at a stator printed circuit board. In this operating state, the magnetic sensors and evaluation electronics necessary for the counting are powered by a backup battery.

German Published Patent Application No. 10 2006 046 531 describes an inductive rotary encoder, which, upon the absence of a system voltage supply, is able to be operated in an energy-saving mode, in which the rotary encoder is powered by a backup battery. To reduce the energy consumption in this mode, it is proposed to supply only a pulsed excitation current to the excitation coils.

SUMMARY

According to example embodiments of the present invention, a position-measurement device includes: a measurement standard including at least one graduation track; a support member including at least one exciter winding, adapted to conduct an excitation current to generate an electromagnetic field, and at least one detector system adapted to scan the electromagnetic field; a capacitor, the exciter winding and the capacitor forming an LC oscillation circuit; an evaluation device; and a switch device switchable by the evaluation device. The measurement standard and the support member are movable relative to each other, and in response to a movement of the measuring standard relative to the support member, the electromagnetic field is influenceable by the at least one graduation track. The LC oscillation circuit is operable by switching of the switch device with an excitation current that induces, in the detector system, at least one voltage that is processable electronically by the evaluation device to ascertain position information. The excitation current is generatable by switching of the switch device with switch-on pulses that have an ON time period. The at least one voltage induced in the detector system is measurable in an area after a cut-off edge of the switch-on pulse to ascertain the position information.

The evaluation device may include at least one measurement unit adapted to measure the at least one induced voltage.

The evaluation device may include a processor unit, and measured values in the at least measurement unit may be suppliable to the processor unit to ascertain the position information.

The switch device may be switchable by the processor unit via a switching line.

The evaluation device may include a trigger unit adapted to generate trigger signals to establish the ON time period of the switch-on pulse and to determine at least one measuring instant for measurement of the at least one induced voltage.

At least one of (a) an excitation voltage resulting from the excitation current and (b) at least one of the induced voltages may be suppliable to the trigger unit to generate the trigger signals.

The trigger signals may include a switch-off trigger signal that determines the cut-off edge of the switch-on pulse, and the trigger unit may be adapted to generate the switch-off trigger signal at an instant of a first zero crossing of the at least one induced voltage.

The trigger signals may include a first measuring trigger signal generated by the trigger unit at an instant of a first apex of the at least one induced voltage after the cut-off edge of the switch-on pulse.

The trigger signals may include a second measuring trigger signal generated by the trigger unit at an instant of the first apex of the at least one induced voltage.

At least one of (a) the first measuring trigger signal and (b) the second measuring trigger signal may be adapted to control measurement of the at least one induced voltage in measuring units of the evaluation device.

The detector system may include first detector windings and second detector windings, within one revolution relative to the support member, and the first detector windings may be adapted to deliver a number of signal maxima different than the second detector windings.

The evaluation device may be integrated in an ASIC.

According to example embodiments of the present invention, a method for operating a position-measuring device having a measurement standard including at least one graduation track, a support member including at least one exciter winding, adapted to conduct an excitation current to generate an electromagnetic field, and at least one detector system adapted to scan the electromagnetic field, a capacitor, the exciter winding and the capacitor forming an LC oscillation circuit, an evaluation device, and a switch device switchable by the evaluation device, the measurement standard and the support member movable relative to each other, and in response to a movement of the measuring standard relative to the support member, the electromagnetic field is influenceable by the at least one graduation track, the LC oscillation circuit being operable by switching of the switch device with an excitation current that induces, in the detector system, at least one voltage that is processable electronically by the evaluation device to ascertain position information, includes: generating the excitation current in the exciter winding by switching the switch device with a switch-on pulse having an ON time period; and measuring the at least one voltage induced in the detector system in an area after a cut-off edge of the switch-on pulse to ascertain the position information.

The method may include switching the switch device via a switching line by a processor unit arranged in the evaluation device.

The at least one induced voltage may be measured in at least one measurement unit arranged in the evaluation device.

The evaluation device may include a trigger unit adapted to generate trigger signals to establish the ON time period of the switch-on pulse and to determine at least one measurement instant for measuring the at least one induced voltage.

The method may include generating the trigger signals in the trigger unit in accordance with at least one of (a) an excitation voltage resulting from the excitation current and (b) at least one induced voltage.

The trigger signals may include a switch-off trigger signal adapted for determining the cut-off edge of the switch-on pulse, and the method may include generating, by the trigger unit, the switch-off trigger signal at an instant of a first zero crossing of the at least one induced voltage.

The trigger signals may include a first measuring trigger signal for determining an instant of a first measurement of the at least one induced voltage, and the method may include generating, by the trigger unit, the first measuring trigger signal in an area of a first apex of the at least one induced voltage after a cut-off edge of the switch-on pulse.

The trigger signals may include a second measuring trigger signal for determining an instant of a second measurement of the at least one induced voltage, and the method may include generating, by the trigger unit, the second measuring trigger signal in an area of a first apex of the at least one induced voltage.

The method may include determining the position information in the processor unit, using a measured value acquired in the area of the first measuring trigger signal and a measured value acquired in an area of a second measuring trigger signal.

Further features and aspects of example embodiments of the present invention are described in more detail below with reference to the appended Figures.

DETAILED DESCRIPTION

Figure 1:
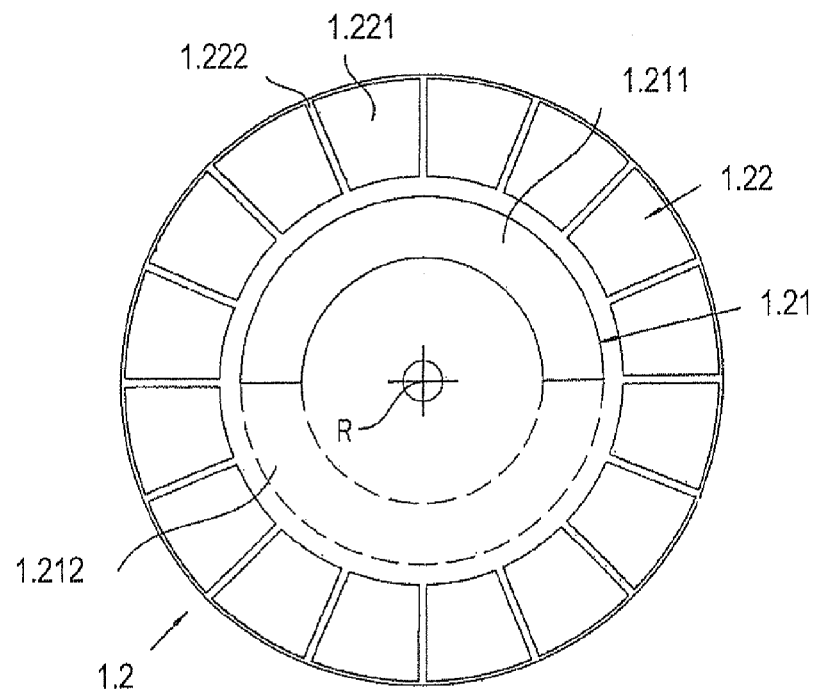
FIG. 1 is a plan view of a code disk.
Figure 2:
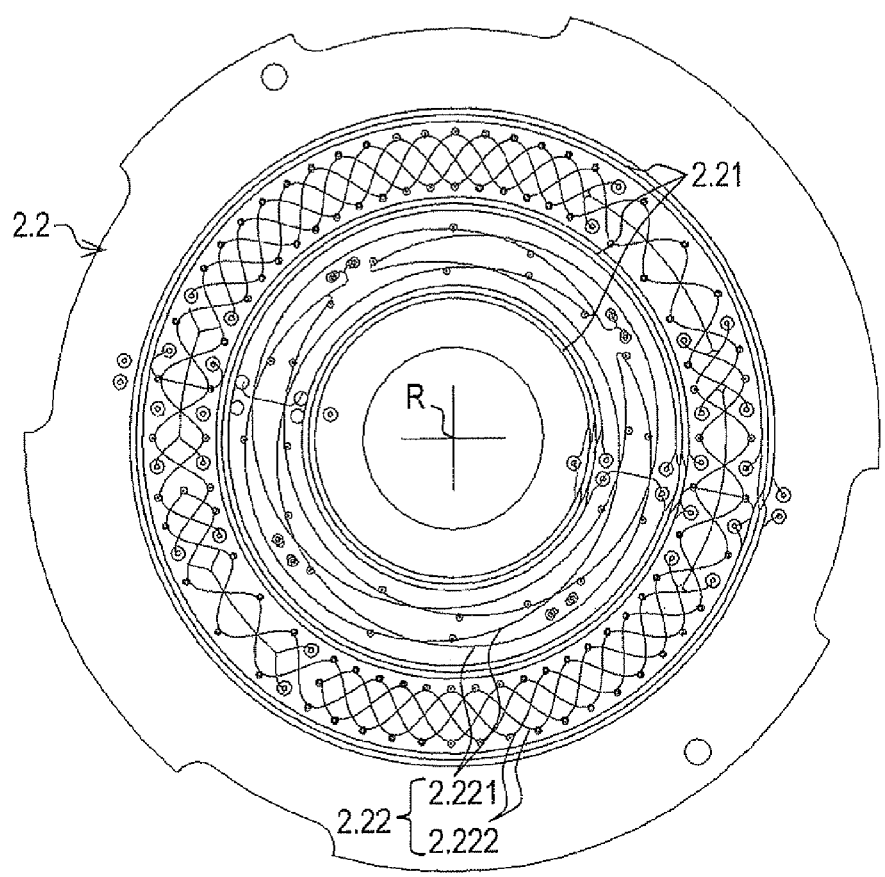
FIG. 2 is a plan view of a scanning printed circuit board.
Figure 6:
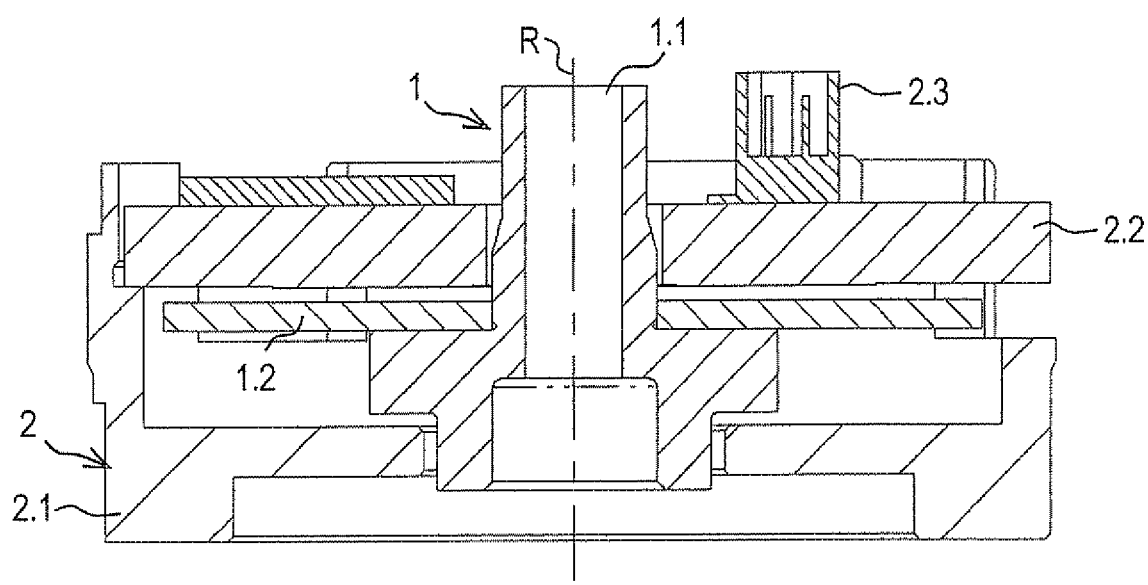
FIG. 6 is a cross-sectional view of a rotary encoder.

FIGS. 1, 2 and 6 show the basic structure of a position-measuring device according to example embodiments of the present invention, using a rotary encoder as example. According to FIG. 6, the rotary encoder has a rotor 1 and a stator 2. In the exemplary embodiment described, rotor 1 includes a shaft 1.1 which, for example, may be mounted in rotatably fixed manner at a motor shaft to be measured. To record the angular position of shaft 1.1, a measuring standard 1.2, in this case in the form of a code disk 1.2 having graduation tracks 1.21, 1.22 is secured in rotatably fixed manner on a shoulder of shaft 1.1.

Stator 2 includes a housing 2.1, to which a ring-shaped scanning printed circuit board 2.2 is attached as support member. Mounted on scanning printed circuit board 2.2, among other things, is a connector 2.3, through which signals and electrical power are able to be transmitted. Rotor 1 and stator 2, i.e., shaft 1.1 and housing 2.1 are rotatable relative to each other about an axis of rotation R.

FIG. 1 is a top view of code disk 1.2. Code disk 1.2 includes a substrate which, in the exemplary embodiment shown, is produced from epoxy resin, and on which two graduation tracks 1.21, 1.22 are disposed. Graduation tracks 1.21, 1.22 are ring-shaped and are disposed concentrically with respect to axis of rotation R and with different diameters on the substrate. The two graduation tracks 1.21, 1.22 each include a periodic sequence of electrically conductive graduation regions 1.211, 1.221 and non-conductive graduation regions 1.212, 1.222 arranged in alternation. In the example shown, copper is applied on the substrate as material for electrically conductive graduation regions 1.211, 1.221. On the other hand, the substrate is not coated in non-conductive graduation regions 1.212, 1.222.

In the example embodiment shown, inner graduation track 1.21 includes a first graduation region 1.211 in the shape of a semi-circular ring and having electrically conductive material, e.g., copper, as well as a second graduation region 1.212 in the shape of a semi-circular ring in which there is no conductive material.

Second graduation track 1.22 is located radially adjacent to first graduation track 1.21 on the substrate, graduation track 1.22 also including a plurality of electrically conductive graduation regions 1.221 and non-conductive graduation regions 1.222 disposed in between. Material-wise, the different graduation regions 1.221, 1.222 are formed in the same manner as graduation regions 1.211, 1.212 of first graduation track 1.21. In total, second graduation track 1.22 in the exemplary embodiment described includes sixteen periodically arranged, electrically conductive graduation regions 1.221, and correspondingly, sixteen non-conductive graduation regions 1.222 disposed in between.

Scanning printed circuit board 2.2, shown in FIG. 2 and provided for scanning code disk 1.2, is used as support member, inter alia, for a detector system which includes various receiver coils 2.22. These receiver coils 2.22 have receiver printed conductors 2.221 as first detector windings in an inner receiver track, and further receiver printed conductors 2.222 as second detector windings in an outer receiver track. Pairs of receiver printed conductors 2.221, 2.222 of a specific receiver track belonging to one another are staggered relative to each other, so that they are able to supply signals distinguishable from one another, from which information is ascertainable about the relative position between rotor 1 and stator 2, as well as their direction of movement. For example, respective receiver printed conductors 2.221, 2.222 of the receiver tracks are offset relative to each other such that the signals resulting from the scanning have a defined phase angle, e.g., 90°. Specific to a phase angle of 90°, this means that when one of the signals of a receiver track is just reaching a positive or negative maximum, the other of the signals has an average value, i.e., relative to the maximum value and the minimum value, a zero crossing.

Moreover, provided as exciter windings on scanning printed circuit board 2.2 are exciter printed conductors 2.21 which are applied on an inner, a middle and an outer exciter track. Scanning printed circuit board 2.2 itself has a central bore, and is implemented as a printed circuit board having a plurality of layers.

In the assembled state, code disk 1.2 and scanning printed circuit board 2.2 are opposite each other, so that axis R extends through the midpoints of both elements, and in response to a relative rotation between code disk 1.2 and scanning printed circuit board 2.2, signals, which are a function of the specific angular position, are able to be generated by induction effects in receiver printed conductors 2.221, 2.222 in scanning printed circuit board 2.2. Position information is thus ascertainable by evaluating these signals.

Prerequisite for the formation of suitable signals is that exciter printed conductors 2.21 generate an electromagnetic exciter field, changing over time, in the area of the scanning tracks, i.e., in the area of graduation tracks 1.21 and 1.22 thereby scanned. In the exemplary embodiment shown, exciter printed conductors 2.21 are in the form of a plurality of planar-parallel, current-carrying, individual printed conductors. If an excitation current flows in the same direction through all exciter printed conductors 2.21 of a printed-conductor unit, then an electromagnetic field oriented in the shape of a tube or cylinder forms around the respective printed-conductor unit. The lines of force of the resulting electromagnetic field extends in the form of concentric circles around the printed-conductor units, the direction of the lines of force being dependent in conventional manner on the direction of current flow in the printed-conductor units. The direction of current flow of the printed-conductor units immediately adjacent to a shared scanning track, that is, the suitable interconnection of these printed-conductor units must be selected to be opposite, so that the lines of force in the area of the scanning tracks are in each case identically oriented.

Figure 3:
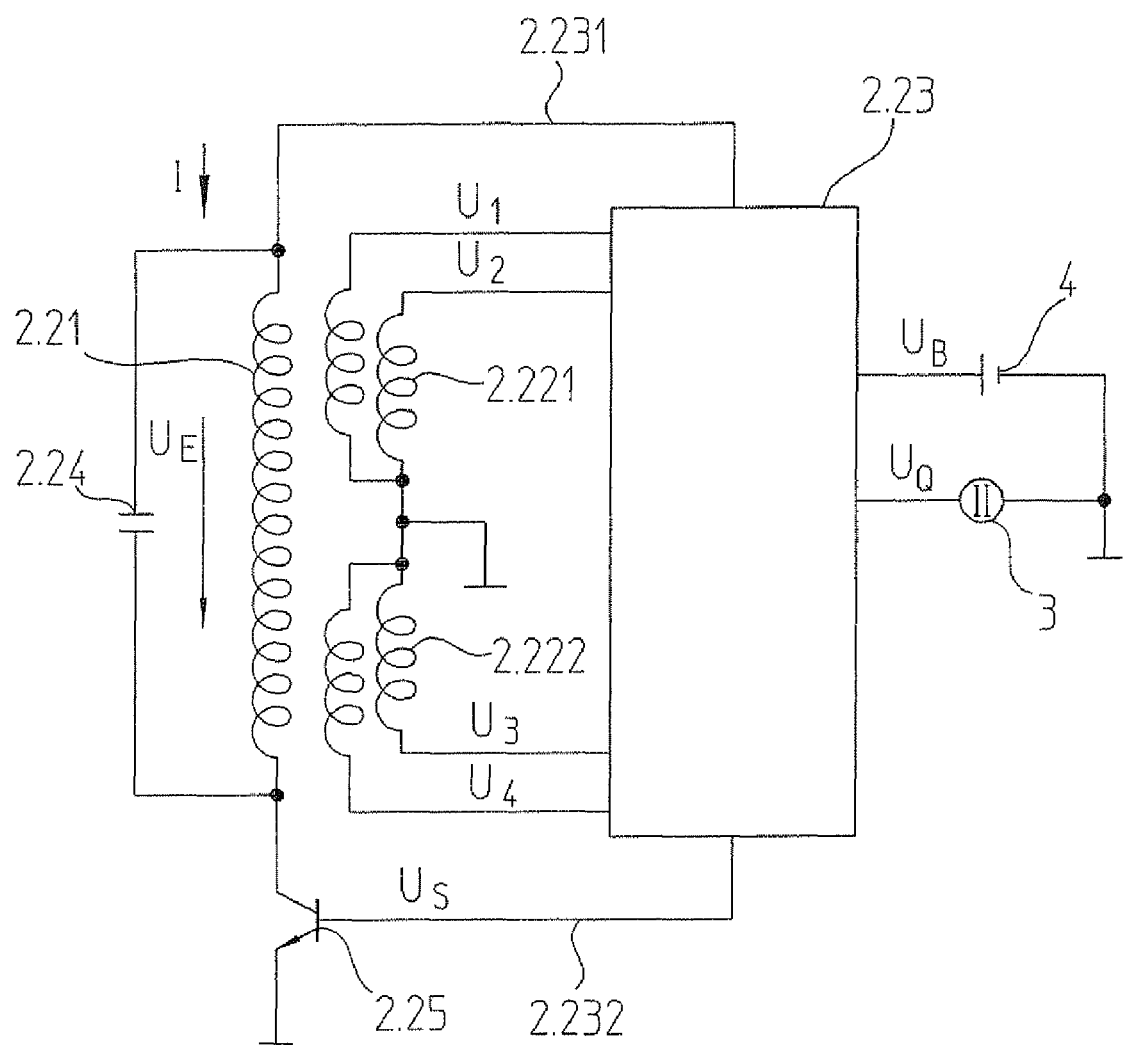
FIG. 3 is a schematic circuit diagram.

A circuit is illustrated schematically in FIG. 3, based on which the functioning method of the rotary encoder is explained. The rotary encoder is connected to an external DC-voltage source 3, via which it is supplied with energy during normal operation. In the exemplary embodiment shown, voltage $U_Q$ of DC-voltage source 3 amounts to five volts. In the event that DC-voltage source 3 is not available for some reason, the rotary encoder is temporarily supplied with electrical energy by a battery 4. For example, the voltage output by battery 4 may amount to three volts. Battery 4 may either be accommodated directly in the rotary encoder, e.g., on scanning printed circuit board 2.2, or may also be disposed externally in sequential electronics, for instance, in a machine tool control.

Situated on scanning printed circuit board 2.2 is an ASIC 2.23 which operates as evaluation element 2.23, under whose control excitation current I is generated, and from the resulting voltages induced in receiver printed conductors 2.221, 2.222, position information, e.g., angle information, is ascertained. According to example embodiments of the present invention, excitation current I is a pulsed current. This is considered particularly advantageous when the rotary encoder is powered via battery 4, since in this case, the energy consumption may be reduced significantly, and therefore the service life of battery 4 may be increased.

Besides the pulsed operation, the rotary encoder may also have other operating modes, e.g., using a continuously supplied, periodic excitation current I.

Capacitor 2.24 and exciter printed conductors 2.21 are connected in parallel and form an electrical LC oscillating circuit having a resonance period duration TR. The value for resonance period duration TR may be between a few hundred nanoseconds and several microseconds, which corresponds to a resonant frequency of several hundred kilohertz up to several megahertz. In this context, with respect to the power loss, higher frequencies are considered to be preferred, since in this case, the LC oscillating circuit has a higher quality.

One terminal of the parallel connection is connected to evaluation element 2.23 via a supply line 2.231, and is supplied via it with voltage, e.g., the voltage of DC-voltage source 3 or of battery 4. The second terminal of the parallel connection is connected via a switching element 2.25 to the ground connection of the circuit. The control as to whether switching element 2.25 is switched on or off takes place via a switching line 2.232 of evaluation element 2.23. Thus, the switching status of switching element 2.25 determines whether or not an excitation current I flows. Switching element 2.25 is shown in FIG. 3 as a bipolar transistor, but other suitable components such as MOSFETs may be used, as well. It is possible for switching element 2.25 to be integrated in evaluation element 2.23.

An electromagnetic field is generated around exciter printed conductors 2.21 by excitation current I. From this field, a magnetic flux results which penetrates receiver coils 2.22. Moreover, excitation current I generates an excitation voltage $U_E$ via the parallel connection of capacitor 2.24 and exciter printed conductors 2.21. Based on the law of induction, voltages $U_1$, $U_2$, $U_3$, $U_4$ are induced in response to a changing magnetic flux in receiver printed conductors 2.221, 2.222. Since the characteristic of induced voltages $U_1$, $U_2$, $U_3$, $U_4$ is a function, inter alia, of the angular position of code disk 1.2 as well, the angular position of code disk 1.2 may be ascertained by evaluating them. Thus, for example, receiver printed conductors 2.221 include two coils, formed by printed conductors, which supply voltages $U_1$, $U_2$ having different amplitudes, depending on the relative position or angle of rotation. Within one revolution relative to the support member, thus given an angle of rotation of $2\pi$ (360°), receiver printed conductors 2.221 deliver voltages $U_1$, $U_2$, respectively, from a maximum to a minimum upon the scanning of first graduation track 1.21. The reason for the position-dependent influencing of the magnetic field, from which the induction of voltages $U_1$, $U_2$ results, is that eddy currents are induced in the electrically conductive, coated regions 1.211, 1.221 of code disk 1.2, the magnitude of the eddy currents being a function of the angular position between code disk 1.2 and scanning printed circuit board 2.2.

Voltages $U_1$, $U_2$, $U_3$, $U_4$ induced in receiver coils 2.22 are supplied to evaluation element 2.23 for ascertaining the position information.

Since graduation track 1.21 has only a single coated region 1.211 and a single uncoated region 1.212, relatively rough absolute position information results from its scanning within one revolution of code disk 1.2 about axis of rotation R. In addition, detection of the direction of the rotary motion is ensured by an evaluation of the amplitude characteristic of the signals. Therefore, a revolution counter may be provided, for example, by the scanning of graduation track 1.21.

The further receiver printed conductors 2.222 on the second outer scanning track are used for the scanning of second graduation track 1.22. A relative offset is provided between the two receiver printed conductors 2.222, so that in response to the scanning of second graduation track 1.22, two signals are obtained on the output side which have an amplitude characteristic as a function of position.

Outer receiver printed conductors 2.222 in each case have sixteen, e.g., $2^4$, windings, so that a comparatively high-resolution incremental signal may be generated by outer receiver printed conductors 2.222 in response to the movement of code disk 1.2 relative to scanning printed circuit board 2.2. Within one revolution relative to the support member, e.g., at a rotational angle of $2\pi$ (360°), receiver printed conductors 2.222 each supply sixteen maxima and minima, respectively, in response to the scanning of graduation track 1.22.

In conjunction with the rough absolute position determination via first graduation track 1.21, an absolute rotational-angle determination is possible using such a configuration.

As an alternative to the example shown, induced voltages $U_1, U_2, U_3, U_4$ may also be generated differentially and not in a manner referred to ground, and processed.

Figure 4:
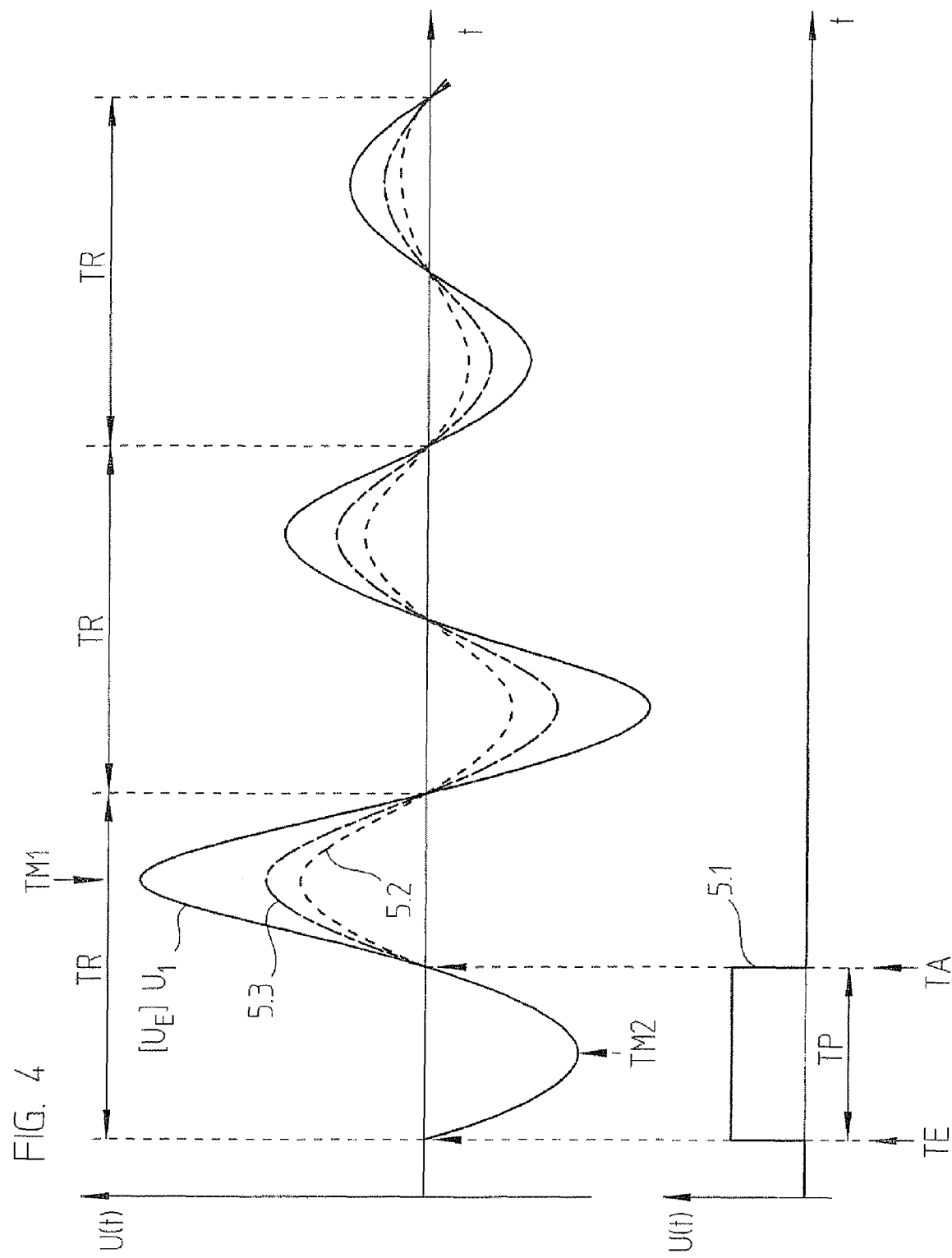
FIG. 4 illustrates a signal pattern of an induced voltage in a detector winding.

Using voltage $U_1$ as an example, FIG. 4 shows the time characteristic of induced voltages $U_1, U_2, U_3, U_4$ in receiver printed conductors 2.221, 2.222 as a function of a switch-on pulse 5.1 on switching line 2.232 which switches on switching element 2.25 at an ON instant TE and switches it off again at an OFF instant TA. The curve in the lower diagram shows switch-on pulse 5.1 with an ON time period TP of switching element 2.25. In the upper diagram, the broken line shows an induced switch-on oscillation 5.2 resulting from the leading edge of switch-on pulse 5.1. This comes about because the switching on of switching element 2.25 produces an excitation current I in exciter printed conductors 2.21, the excitation current giving rise to a changing, increasing magnetic flux. The dashed line shows a switch-off oscillation 5.3 induced by the cut-off edge of switch-on pulse 5.1. This switch-off oscillation is generated by the switching off of switching element 2.25, i.e., the switching off of excitation current I and the decreasing magnetic flux resulting therefrom. The solid line shows voltage $U_1$, which is obtained by a superimposition of switch-on oscillation 5.2 and switch-off oscillation 5.3. Since the change in the magnetic flux has a different algebraic sign upon switching on and switching off, switch-on oscillation 5.2 and switch-off oscillation 5.3 have a reverse polarity. Up to the cut-off edge of switch-on pulse 5.1, no superimposition takes place. Therefore, up to this instant, voltage $U_1$ and switch-on oscillation 5.2 are identical.

Exciter printed conductors 2.21 and receiver printed conductors 2.221 or 2.222 represent a transformer. For this reason, the signal pattern of induced voltages $U_1, U_2, U_3, U_4$ corresponds substantially to that of excitation voltage $U_E$. However, excitation voltage $U_E$ has a higher signal amplitude, which moreover, is not dependent on the relative position between code disk 1.2 and scanning printed circuit board 2.2. Therefore, in FIG. 4, excitation voltage $U_E$ is indicated in square brackets next to induced voltage $U_1$.

As a result of the superimposition of switch-on oscillation 5.2 and switch-off oscillation 5.3, in the area of the apex of the first half wave of switch-off oscillation 5.3, produced by the cut-off edge of switch-on pulse 5.1, i.e., of voltage $U_1$ (denoted by a first measuring trigger signal TM1) a voltage is measured which is substantially higher than without superimposition. The acquisition of the position information is therefore substantially more immune to interference in this case. In addition, a higher accuracy of the measurement may be achieved.

The ascertainment of the position information may be improved still further if not only the voltage in the area of the apex of the first half wave of voltage $U_1$ after the cut-off edge of switch-on pulse 5.1 is measured, but also the voltage in the area of the apex of the first half wave of switch-on oscillation 5.2 produced by the leading edge of switch-on pulse 5.1 (indicated by a second measuring trigger signal TM2). A redundancy is thereby introduced, which may be used to check the plausibility of the two voltage values by comparing them. For instance, that the signs of the two voltage values are reversed relative to each other may be used as a criterion for correct functioning. A simple check of the functioning of the measuring system is therefore possible.

In addition, it is possible to first add the two voltage values at the first two apexes of voltage $U_1$ in analog fashion as to actual amount prior to the measurement in order to obtain a higher evaluable signal amplitude and to further increase the interference immunity and accuracy of the measurement.

Induced voltages $U_1, U_2, U_3, U_4$ are electronically processed by evaluation element 2.23 such that corresponding angular-position information is ascertained for shaft 1.1.

The case illustrated, in which the cut-off edge of switch-on pulse 5.1 is triggered in response to the first zero crossing of induced voltage $U_1$, leads to an optimal superimposition of switch-on oscillation 5.2 and switch-off oscillation 5.3, and therefore to the highest achievable signal amplitude of induced voltage $U_1$. Therefore, it is considered preferable to strive for a high signal amplitude to be evaluated. ON time period TP in this case corresponds to half of resonance period duration TR (TP=TR/2). However, slight deviations, particularly when the cut-off edge of switch-on pulse 5.1 is triggered in the area between one-fourth and three-fourths of the resonance period duration, also lead to evaluable signals.

On the other hand, for the case when the intention is to realize a particularly energy-efficient position-measuring device, it is considered advantageous to limit ON time period TP to one-fourth of resonance period duration TR (TP=TR/4), since this period of time is sufficient to form an evaluable voltage $U_1$. Due to the brief time in which the LC oscillating circuit must be supplied with current, in the case of battery operation, for example, a very long service life of battery 4 may be achieved.

Figure 5:
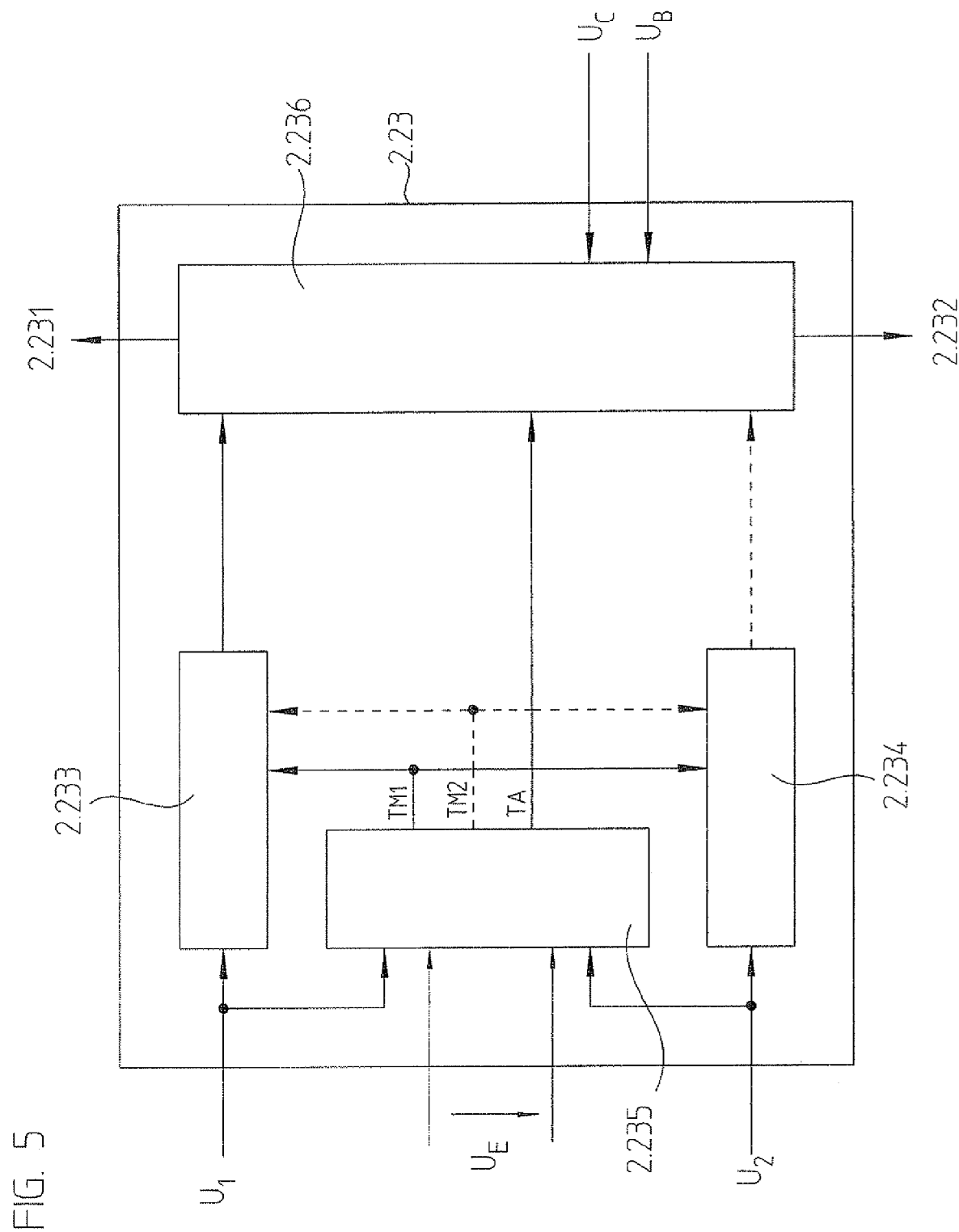
FIG. 5 is a schematic block diagram of an evaluation element.

FIG. 5 is a block diagram of an evaluation element 2.23, only the units being illustrated that are needed for the evaluation of two voltages $U_1, U_2$, by the scanning of one graduation track with the aid of two receiver printed conductors staggered relative to each other, e.g., the scanning of first graduation track 1.21 with the aid of receiver printed conductors 2.221.

A first voltage $U_1$ and a second voltage $U_2$, which result from the scanning of first graduation track 1.21 with the aid of the two receiver printed conductors 2.221 staggered relative to each other, as well as excitation voltage $U_E$ form the inputs of evaluation element 2.23. As described above, the amplitudes of first voltage $U_1$ and of second voltage $U_2$, respectively, are a function of the relative position of receiver printed conductors 2.221 with respect to graduation track 1.21. First voltage $U_1$ is fed to a first measuring unit 2.233, and second voltage $U_2$ is fed to a second measuring unit 2.234. Measuring units 2.233 and 2.234 are used to measure voltages $U_1$ and $U_2$, respectively, and to pass on the results of the measurements to a processing unit 2.236.

To determine the time sequence of the measurements, excitation voltage $U_E$ is supplied to a trigger unit 2.235. The trigger unit 2.235 ascertains trigger signals for establishing ON time period TP of switch-on pulse 5.1, as well as for determining at least one measuring instant for measuring voltages $U_1$, $U_2$ and transmits them to processing unit 2.236 and to measuring units 2.233, 2.234, respectively. Excitation voltage $U_E$ is considered hereinafter in simplified terms as single-ended signal. Two instants are considered particularly advantageous for the measuring procedure, e.g., the first apex of voltage $U_1$ or $U_2$ after the cut-off edge of switch-on pulse 5.1, since at this point, voltage $U_1$, $U_2$ to be measured has the greatest amplitude, and the first zero crossing of switch-on oscillation 5.2, since a favorable instant exists here for the cut-off edge of switch-on pulse 5.1. For example, trigger unit 2.235 is provided such that, at these instants, it outputs trigger signals to measuring units 2.233 and 2.234, as well as to processing unit 2.236, so that it is able to control the measuring procedure accordingly.

Switch-off instant TA upon the zero crossing of switch-on oscillation 5.2 corresponds to a great extent to the zero crossing of excitation voltage $U_E$ and, for example, may be determined in trigger unit 2.235 simply with the aid of a zero-point detector, e.g., a comparator, which compares the voltage characteristic of excitation voltage $U_E$ to a reference voltage, e.g., the ground potential of the circuit. The result of the comparison is output in the form of a switch-off trigger signal TA to processing unit 2.236.

Voltages $U_1$, $U_2$ reach the first apex starting from the cut-off edge of switch-on pulse 5.1 after one-fourth of resonance period duration TR. For example, the property of the mutual derivation of sine and cosine functions may be utilized for ascertaining this instant. Specifically, excitation voltage $U_E$ may be supplied to an analog differentiator in which the derivation of excitation voltage $U_E$ is formed. In turn, the output signal of the differentiator may be passed on to a zero-point detector that, at the instant of the zero crossing of differentiated excitation voltage $U_E$, which coincides to a great extent with the apex of voltages $U_1$, $U_2$, outputs a first measuring trigger signal TM1 to measuring units 2.233, 2.234. Instead of the differentiator, for instance, an integrator may be used, as well.

In example embodiments, first measuring trigger signal TM1 for measuring voltages $U_1$, $U_2$ in the area of the first apex after the cut-off edge of switch-on pulse 5.1 may also be generated by automatically, e.g., using a timing element, outputting it one-fourth period duration of the LC resonant frequency after switch-off trigger signal TA (i.e., the cut-off edge of switch-on pulse 5.1).

Instead of, or in addition to excitation voltage $U_E$, voltages $U_1$, $U_2$ may also be used for forming trigger signals TA, TM1. However, since they have a smaller amplitude than excitation voltage $U_E$, which, moreover, is still a function of position, the use of excitation voltage $U_E$ is considered to be preferred.

As mentioned above, it is considered particularly advantageous if not only the first apex of voltages $U_1$, $U_2$ after the cut-off edge of switch-on pulse 5.1 is used for determining voltages $U_1$, $U_2$, but also the first apex of switch-on oscillation 5.2. Starting from the leading edge of switch-on pulse 5.1, voltages $U_1$, $U_2$ reach this apex after one-fourth of resonance period duration TR. In order to measure voltages $U_1$, $U_2$ at this instant, a second measuring trigger signal TM2 may be generated in trigger unit 2.235 at the instant of the first apex of switch-on oscillation 5.2, this signal also being fed to measuring units 2.233, 2.234. To that end, for example, the procedures already described may be used (differentiator or integrator in conjunction with a zero-point detector, or output of second measuring trigger signal TM2 one-fourth period duration of the LC resonant frequency after the leading edge of switch-on pulse 5.1).

The measurement of voltages $U_1$, $U_2$ in measuring units 2.233, 2.234 at the instants of measuring trigger signals TM1, TM2 may be provided, for example, by acquiring the instantaneous voltage value using analog-digital converters both at the instant of first measuring trigger signal TM1 and at the instant of second measuring trigger signal TM2, and transmitting the result to processing unit 2.236 for further processing. In this case, conclusions about the correct functioning of the measuring system may be drawn in processing unit 2.236 from the relationship of the two measured values.

It is also considered to be particularly advantageous if the voltage values at the instant of second measuring trigger signal TM2 and at the instant of first measuring trigger signal TM1 are first stored with the aid of sample and hold circuits in measuring units 2.233, 2.234 and subsequently added in analog fashion, taking into consideration the opposite polarity (e.g., with the aid of a differential amplifier), and only the resulting signal is measured with the aid of the analog-digital converter, since in this case, the input-voltage range of the analog-digital converter may be better utilized, and thus the accuracy of the measurement may be further improved.

Instead of the differentiator, other suitable circuits may also be used such as, for example, maximum-value detectors, PLL components, etc.

In a further example embodiments, voltages $U_1$, $U_2$ may also be evaluated by digitizing the signal pattern, e.g., as of the instant of the leading edge of switch-on pulse 5.1, and subsequent evaluation with the aid of signal-processing algorithms. In this case, it is considered advantageous to use a microcontroller or a digital signal processor (DSP) as evaluation element 2.23. This approach further has the advantage that microcontrollers or digital signal processors usually already have switching outputs, so that further expenditure for generating switch-on pulse 5.1 is no longer necessary.

At this point, it should also be pointed out that microcontrollers or signal processors are also available as what are referred to as IP cores, which may be integrated into an ASIC.

The preceding explanations relate to a rotary encoder for measuring angular positions, e.g., of a motor shaft. It should be understood that the position-measuring device may also be a linear position-measuring device. In this case, measuring standard 1.2 is in the form of a scale which is read by a scanning unit, the scale and scanning unit being disposed in a manner allowing movement relative to each other in a measuring direction X. The scanning unit in this case includes the exciter printed conductors and receiver printed conductors, which are aligned lengthwise with respect to the direction of movement.

What is claimed is:

1. A position-measurement device, comprising:
    a measurement standard including at least one graduation track;
    a support member including at least one exciter winding to conduct an excitation current to generate an electromagnetic field, and at least one detector system to scan the electromagnetic field;
    a capacitor, the exciter winding and the capacitor forming an LC oscillation circuit;
    an evaluation device; and
    a switch device switchable by the evaluation device;
    wherein the measurement standard and the support member are movable relative to each other, and in response to a movement of the measuring standard relative to the support member, the electromagnetic field is influenced by the at least one graduation track;

wherein the LC oscillation circuit operates by switching via the excitation current of the switch device that induces, in the detector system, at least one voltage that is processed electronically by the evaluation device to ascertain position information;

wherein the excitation current is generated by switching of the switch device with switch-on pulses that have an ON time period; and wherein the at least one voltage induced in the detector system is measured in an area after a cut-off edge of the switch-on pulse to ascertain the position information.

2. The position-measurement device according to claim 1, wherein the evaluation device includes at least one measurement unit to measure the at least one induced voltage.

3. The position-measurement device according to claim 2, wherein the evaluation device includes a processor unit, wherein measured values in the at least one measurement unit are supplied to the processor unit to ascertain the position information.

4. The position-measurement device according to claim 3, wherein the switch device is switchable by the processor unit via a switching line.

5. The position-measurement device according to claim 1, wherein the evaluation device includes a trigger unit to generate trigger signals to establish the ON time period of the switch-on pulse and to determine at least one measuring instant for measurement of the at least one induced voltage.

6. The position-measurement device according to claim 5, wherein at least one of (a) an excitation voltage resulting from the excitation current and (b) at least one of the induced voltages is supplied to the trigger unit to generate the trigger signals.

7. The position-measurement device according to claim 5, wherein the trigger signals include a switch-off trigger signal that determines the cut-off edge of the switch-on pulse, and the trigger unit generates the switch-off trigger signal at an instant of a first zero crossing of the at least one induced voltage.

8. The position-measurement device according to claim 5, wherein the trigger signals include a first measuring trigger signal generated by the trigger unit at an instant of a first apex of the at least one induced voltage after the cut-off edge of the switch-on pulse.

9. The position-measurement device according to claim 8, wherein the trigger signals include a second measuring trigger signal generated by the trigger unit at an instant of the first apex of the at least one induced voltage.

10. The position-measurement device according to claim 9, wherein at least one of (a) the first measuring trigger signal and (b) the second measuring trigger signal controls measurement of the at least one induced voltage in measuring units of the evaluation device.

11. The position-measurement device according to claim 1, wherein the detector system includes first detector windings and second detector windings, within one revolution relative to the support member, the first detector windings delivering a number of signal maxima different than the second detector windings.

12. The position-measurement device according to claim 1, wherein the evaluation device is integrated in an ASIC.

13. A method for operating a position-measuring device having a measurement standard including at least one graduation track, a support member including at least one exciter winding to conduct an excitation current to generate an electromagnetic field, and at least one detector system to scan the electromagnetic field, a capacitor, the exciter winding and the capacitor forming an LC oscillation circuit, an evaluation device, and a switch device switchable by the evaluation device, the measurement standard and the support member movable relative to each other, and in response to a movement of the measuring standard relative to the support member, the electromagnetic field is influenced by the at least one graduation track, the LC oscillation circuit operates by switching via an excitation current of the switch device that induces, in the detector system, at least one voltage that is processed electronically by the evaluation device to ascertain position information, comprising:

generating the excitation current in the exciter winding by switching the switch device with a switch-on pulse having an ON time period; and measuring the at least one voltage induced in the detector system in an area after a cut-off edge of the switch-on pulse to ascertain the position information.

14. The method according to claim 13, further comprising switching the switch device via a switching line by a processor unit arranged in the evaluation device.

15. The method according to claim 13, wherein the at least one induced voltage is measured in at least one measurement unit arranged in the evaluation device.

16. The method according to claim 13, wherein the evaluation device includes a trigger unit to generate trigger signals to establish the ON time period of the switch-on pulse and to determine at least one measurement instant for measuring the at least one induced voltage.

17. The method according to claim 16, further comprising generating the trigger signals in the trigger unit in accordance with at least one of (a) an excitation voltage resulting from the excitation current and (b) at least one induced voltage.

18. The method according to claim 16, wherein the trigger signals include a switch-off trigger signal for determining the cut-off edge of the switch-on pulse, the method further comprising generating, by the trigger unit, the switch-off trigger signal at an instant of a first zero crossing of the at least one induced voltage.

19. The method according to claim 16, wherein the trigger signals include a first measuring trigger signal for determining an instant of a first measurement of the at least one induced voltage, the method further comprising generating, by the trigger unit, the first measuring trigger signal in an area of a first apex of the at least one induced voltage after a cut-off edge of the switch-on pulse.

20. The method according to claim 18, wherein the trigger signals include a second measuring trigger signal for determining an instant of a second measurement of the at least one induced voltage, the method further comprising generating, by the trigger unit, the second measuring trigger signal in an area of a first apex of the at least one induced voltage.

21. The method according to claim 19, further comprising determining the position information in the processor unit, using a measured value acquired in the area of the first measuring trigger signal and a measured value acquired in an area of a second measuring trigger signal.

* * * * *